United States Patent [19]

Moreno

[11] 4,162,120

[45] Jul. 24, 1979

[54] THERMAL COMPENSATOR LINKAGE

[75] Inventor: Isabel L. Moreno, Long Beach, Calif.

[73] Assignee: Ford Aerospace & Communications Corp., Dearborn, Mich.

[21] Appl. No.: 856,699

[22] Filed: Dec. 2, 1977

[51] Int. Cl.² .............................................. G02B 7/02
[52] U.S. Cl. .................................................. 350/253
[58] Field of Search ........................ 350/252, 253, 255

[56] References Cited

U.S. PATENT DOCUMENTS

| | | | |
|---|---|---|---|
| 1,325,936 | 12/1919 | Fouasse | 350/253 |
| 2,533,478 | 12/1950 | Lee et al. | 350/253 |
| 2,537,900 | 1/1951 | Lee et al. | 350/253 |
| 3,205,774 | 9/1965 | Estes | 350/253 |
| 3,484,718 | 12/1969 | Foster | 350/253 X |
| 3,601,343 | 8/1971 | Sivaslian | 350/252 X |
| 3,612,664 | 10/1971 | Berman | 350/253 |
| 3,671,108 | 6/1972 | Kilgus | 350/253 |
| 4,045,129 | 8/1977 | Hamar | 350/252 X |

Primary Examiner—F. L. Evans

Attorney, Agent, or Firm—Paul K. Godwin, Jr.; Clifford L. Sadler

[57] ABSTRACT

A linearly expanding and contracting linkage assembly, responsive to changes in temperature, is constructed from a plurality of elongated link elements having alternately dissimilar linear coefficients of expansion. The link elements are adjacently arranged in link pairs and the links in each pair are joined at a first end so as to appear folded. Each pair includes a first link element with a relatively large coefficient of expansion and a second element with a relatively small linear coefficient of expansion, so that the amount of linear movement of the second end of the second element with respect to the second end of the first element in each pair is due to the difference between the dissimilar linear coefficients of expansion. A plurality of link pairs are serially connected together at their second ends so that the total linear movement of the second end of the second link of the last serially connected pair with respect to the first end of the first link of the first pair is the sum of linear movements contributed by each of the serially connected pairs.

9 Claims, 7 Drawing Figures

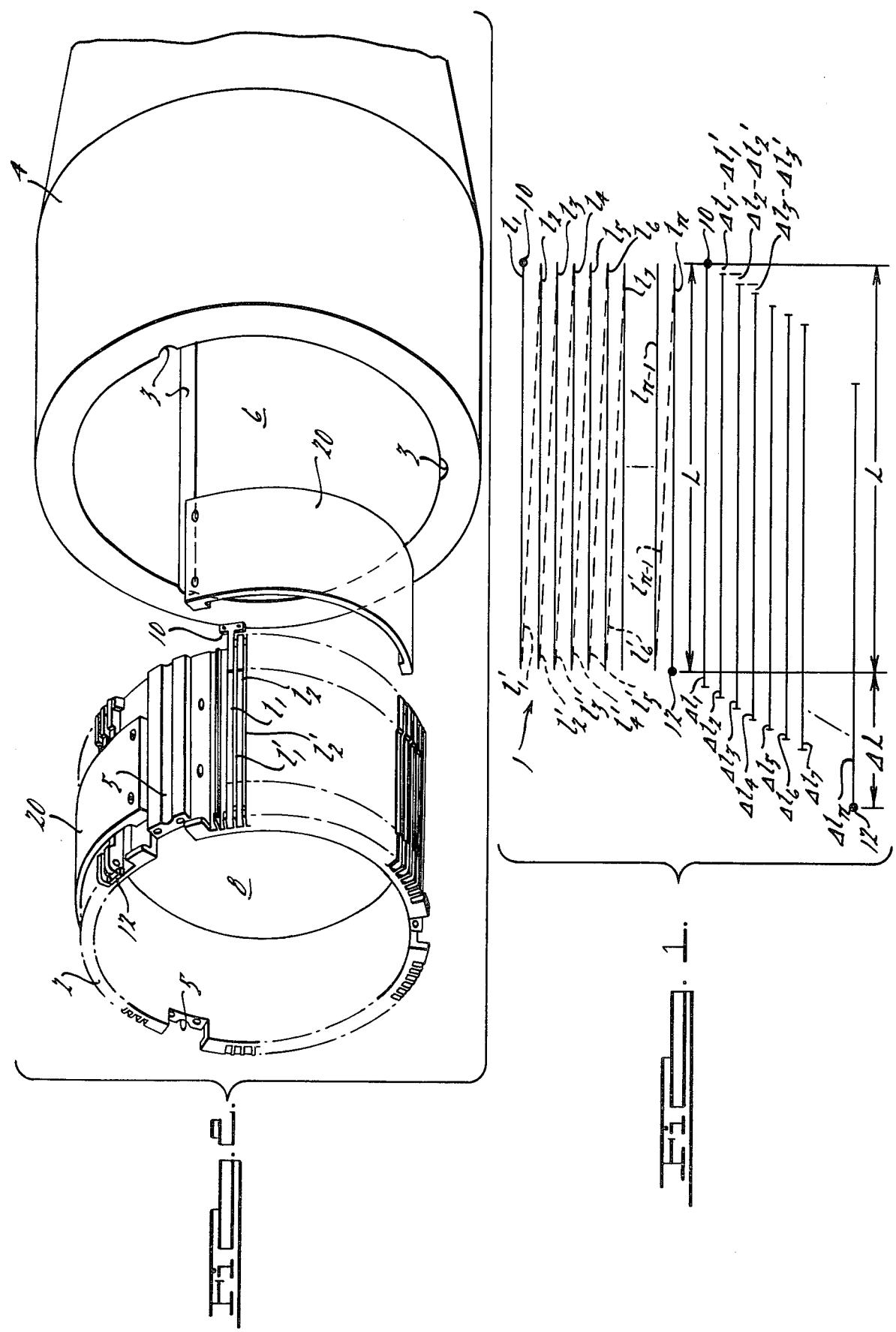

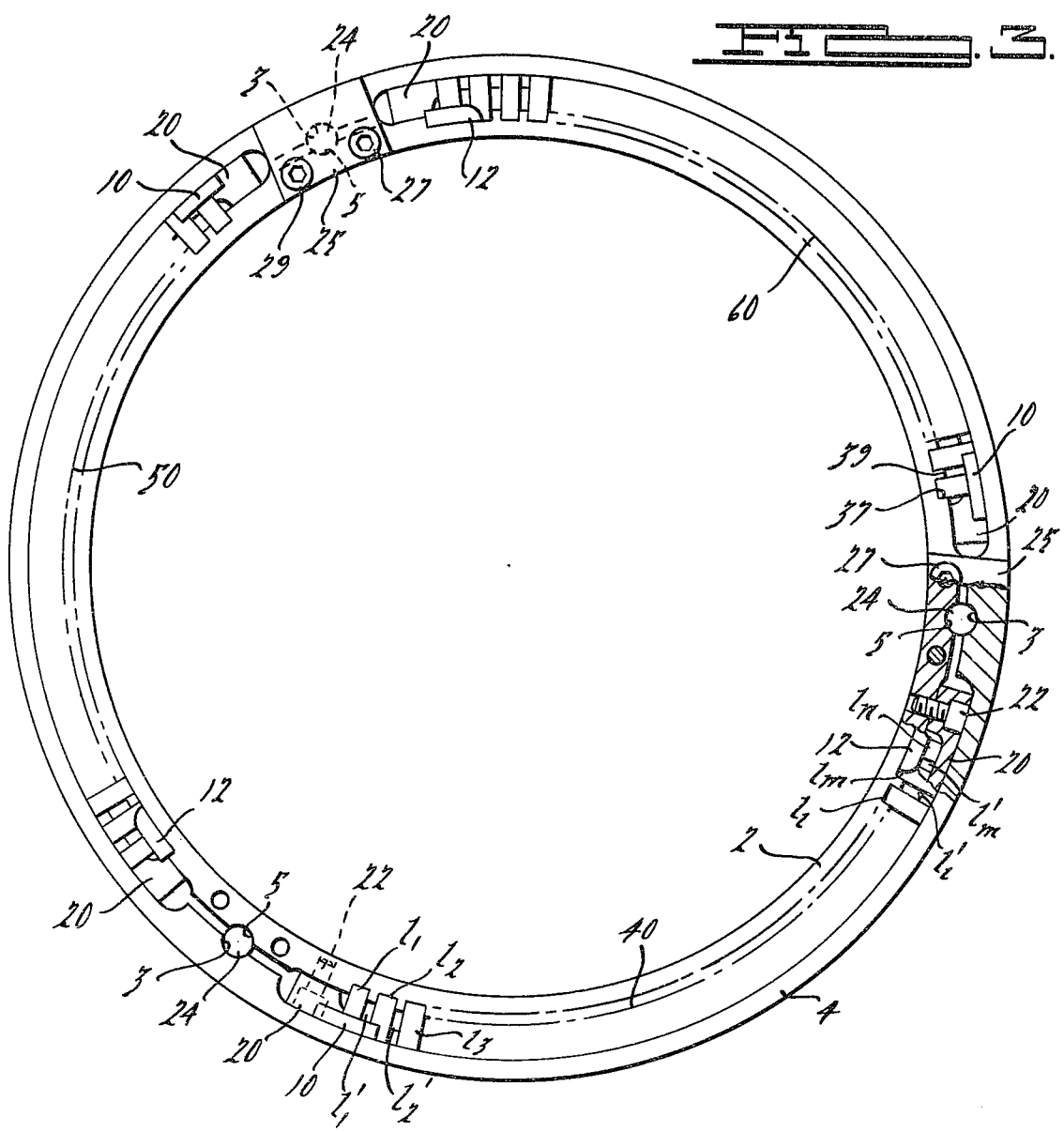
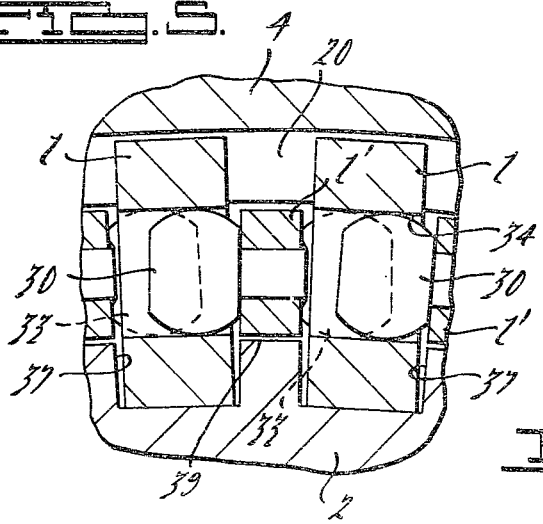
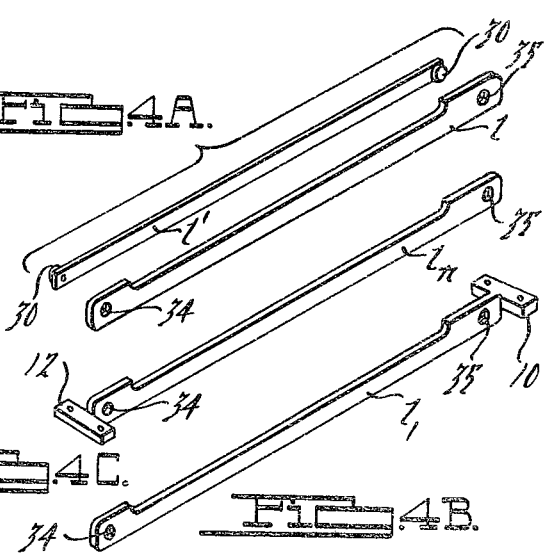

THERMAL COMPENSATOR LINKAGE

BACKGROUND OF THE INVENTION

1. Field of the Invention

The present invention relates to mechanical linkages which provide linear movement in response to temperature changes. More specifically, the present invention relates to improvements in thermal compensator mechanisms as employed in optical systems.

2. Description of the Prior Art

The problem of focus distortion in optical systems due to changes in temperature has been frequently discussed in the prior art. Generally, temperature variations cause glass lenses to expand or contract and vary the indices thereof. The lens mounts also tend to expand or contract due to changes in temperature and additionally affect the focal point. In order to maintain a fixed focal point throughout wide variations in temperature, many systems have been developed for compensating the above mentioned expansion and contraction.

In U.S. Pat. No. 1,325,936, compensation was achieved between two lenses by mounting each lens in separate mounting barrels and connecting the barrels at a point removed from the lenses. The two barrels were made of materials having different thermal coefficients of expansion, so that any change in temperature resulted in a separation change between the lenses corresponding to the difference between the two barrel expansions or contractions.

In U.S. Pat. No. 2,533,478, compensation was achieved by mounting the lenses in a barrel having a relatively low coefficient of expansion and connecting one end of the lens barrel to an expandable sleeve having a relatively high coefficient of expansion. The other end of the expandable sleeve was connected to an outer support sleeve having a relatively low coefficient of expansion.

In U.S. Pat. No. 2,537,900, compensation was achieved by mounting the lenses in a barrel having a relatively low coefficient of expansion and connecting one end of the lens barrel to a camera body. The camera body had a relatively high coefficient of expansion to vary the position of the focal point in compensating fashion to maintain the preset focus.

SUMMMARY OF THE INVENTION

The present invention overcomes the basic size restriction problems inherent in the prior art by employing a unique summation type optical compensator linkage.

Large compensational changes are achieved by a multi-element linkage made up of several small links having dissimilar linear coefficients of expansion. A first type of link is an elongated element having a relatively high linear coefficient of expansion, such as aluminum or magnesium. A second type of length is an elongated element having a relatively low linear coefficient of expansion, such as Kovar or Invar. The first and second link element types are alternately arranged and connected to each other to form an accordion folded linkage. When employed in an optical system, one end of the folded linkage is pin connected to a fixed support member and the other end of the folded linkage is connected to a movable lens mounting barrel. By folding the link elements at their pinned connections, the differential length change $\Delta l$ caused by temperature changes for each pair of first and second link elements contribute to the total compensated length change. Therefore, if n pairs of first and second link elements are connected in a single compensation linkage, the total compensated length change $\Delta L = \Delta l_1 + \Delta l_2 + \Delta l_3 \ldots \Delta l_n$.

Each linkage assembly arrangement has the definite advantage of reducing the optical assembly length needed to effect the type of compensation disclosed in the prior art. This reduction in length also has the advantage of reducing the amount of structure and its inherent mass weight, even though multiple assemblies may be employed to give balanced movement to the movable lens barrel with respect to the outer support barrel.

It is an object of the present invention to provide a novel compact lens housing, wherein a floating lens is mechanically controlled to optically compensate for its environmental temperature variation.

It is another object of the present invention to provide an optical thermal compensator structure utilizing a foldable linkage assembly in which thermal responsive length changes of the link elements have a summing effect to the total assembly length change.

BRIEF DESCRIPTION OF THE DRAWINGS

FIG. 1 illustrates the effect of summing the individual thermal expansions contributed by individual link pairs as employed in the present invention.

FIG. 2 illustrates the present invention employed as a thermal compensator in an optical telescope system.

FIG. 3 is an end view of the floating lens mount employed with the thermal compensator shown in FIG. 2.

FIG. 4A is a detailed drawing of a typical link pair as used in the present invention.

FIG. 4B illustrates the link $l_1$, which is connected to the outer relatively fixed barrel mount shown in FIGS. 2 and 3.

FIG. 4C illustrates the link $l_n$, which is connected to the inner floating lens mount shown in FIGS. 2 and 3.

FIG. 5 is a detailed cross section of the pin connection of link pairs as assembled in the thermal compensator network.

DESCRIPTION OF THE PREFERRED EMBODIMENT

The linkage assembly of the present invention is schematically illustrated in FIG. 1. First link elements $l_1, l_2 \ldots l_n$, (n being a positive integer) made of a material having a relatively high linear coefficient of expansion such as aluminum or magnesium, are in an adjacent parallel arrangement. Second link elements $l_1', l_2', \ldots l_n'$ -1 (or $l_n'$), made of a material having a relatively low linear coefficient of expansion, such as Kovar or Invar are connected to opposite ends of adjacent first links so as to form a serially connected accordion folded linkage having parallel oriented link elements.

In the illustrated assembly, all the links have a length dimension L between connections. Therefore, when the environmental temperature changes, each link $l_i$, (i being a positive integer less than or equal to n) will change its length by an amount $\Delta l_i$, according to its linear coefficient of expansion. Accordingly, each link pair including links $l_i$ and $l_i'$ has a combined length change which is the difference between $\Delta l_i$ and $\Delta l_i'$.

A length change $\Delta L$ of the linkage assembly, due to increased temperature, is shown in the lower half of FIG. 1, wherein connecting points 10 and 12 indicate the extreme ends of the serially connected elements. The total length change $\Delta L$ is defined as the summation of all the link pair changes. That is, $$\Delta L = \sum_{i=1}^{n} \Delta l_i - \Delta l_i'.$$

The thermally responsive linkage assembly, disclosed above, is found to be particularly advantageous when employed in an optical system as a thermal compensator. The primary advantage is a reduced overall size (length) in the lens system, being compensated by the compact linkage, combined with a corresponding weight reduction. This is of primary interest to those designing large lens systems with relatively short focal lengths for use in aircraft or spacecraft where size and weight are critical.

The following discussion is directed to the previously described thermally responsive linkage employed as a thermal compensator, with co-reference to FIGS. 2, 3, 4A, 4B, 4C and 5. In this embodiment, an outer, relatively stationary, support barrel 4 has a large coaxial opening 6 and a plurality of longitudinally extending grooves 3 on the inside wall of the opening 6. An inner, relatively movable lens mounting barrel 2 is configured to be supported within the opening 6 of the barrel 4 for longitudinal movement with respect thereto. Grooves 5 are located about the periphery of the barrel 2 to correspond with the grooves 3 in the barrel 4. Bearings 24 are located between the grooves 3 and 5 to allow for smooth movement between the barrels. The barrel 2, containing at least one lens element 8, has several tracks 37 and 39 which are used to guide the linear movement of the individual link elements of the three link assemblies 40, 50 and 60. The thermally responsive linkage assemblies are each located between the barrels 4 and 2 and are respectively attached to each barrel at the points 10 and 12.

An aluminum link $l_1$ is connected to the relatively stationary barrel 4 at point 10 and an aluminum link $l_n$ is connected to the relatively movable barrel 2 at point 12.

The Kovar links $l_1'$, $l_2'$, ... $l_n'$-1 are pin connected to opposite ends of adjacent aluminum links; and all the links are retained in their respective tracks 37 and 39 by a retainer plate 20. The retainer plate 20 may be of any material that allows smooth low-friction movement of the linkage assembly and movement between the barrels 2 and 4. Material sold under the trademark Teflon has been found to be suitable for use as the retainer plate 20. The retainer plate 20 is fastened to the barrel 2 by screws 22 to contain the linkage assembly. Since, this embodiment employs a plurality of like linkage assemblies 40, 50 and 60 to provide a balanced compensating movement, a like retainer plate 20 is used for each assembly.

The ends of each Kovar link $l'$ have rounded pins 30 extending in opposite lateral directions. Each of the aluminum links 1 have receptive sockets 34 and 35 for receiving the rounded pins 30 of the Kovar links $l'$. Therefore, an aluminum/Kovar link pair is connected together at the first end of each link and the second ends are connected to second ends of adjacent link pairs.

Although the above described embodiment causes the floating lens mount barrel 2 to move outwardly with respect to the barrel 4 when the temperature increases, it should be noted that the opposite movement is achieved for increasing temperature by reversing the connections at 10 and 12. That is, connection 10 can be made to the barrel 2 and connection 12 can be made to the barrel 4. In addition, conventional spring-biasing may be employed between the two lens barrels to eliminate any looseness in the linkage connections.

The aluminum/Kovar linkage employed herein is understood to be representative of typical materials with respectively relatively high and relatively low linear coefficients of expansions. Other materials that may be respectively substituted for aluminum and Kovar are magnesium and Invar. Depending upon the amount of movement desired, space and weight requirements, other materials having known coefficients of expansion may also be substituted.

It will be apparent that many modifications and variations may be effected without departing from the scope of the novel concept of this invention. Therefore, it is intended by the appended claims to cover all such modifications and variations which fall within the true spirit and scope of the invention

I claim:

1. A thermal compensator mechanism for maintaining a preset focal length in an optical system throughout a predetermined range of environmental temperatures, comprising:
    a relatively movable lens mounting structure;
    a relatively fixed support structure;
    a linkage assembly, including a plurality of elongated link elements with known linear coefficients of expansion, connected to said lens mounting structure and to said support structure for moving said lens mounting structure linearly with respect to said support structure in response to environmental temperature changes;
    wherein elongated link elements are arranged in link pairs and each said link pair includes a first link element having a relatively large linear coefficient of expansion and a second link element having a relatively small linear coefficient of expansion; and
    further wherein said first and second elongated link elements of each link pair are connected together at their corresponding first ends and folded at said connection so that their respective second ends are adjacent each other.

2. A thermal compensator mechanism as in claim 1, wherein said link pairs are distributed between said lens mounting structure and said support structure; and
    said second end of said first link of each pair is connected to an adjacent second end of a second link of an adjacent pair.

3. A thermal compensator mechanism as in claim 2, wherein said linkage assembly includes n+1 first links and n second links, n being defined as a positive integer, forming n link pairs; and further wherein a second end of a first link of the first of n link pairs is connected to said lens mounting structure, the second end of the n+1 first link is connected to the second end of the second link of the nth pair, and the first end of the n+1 first link is connected to the support structure.

4. A thermal compensator mechanism as in claim 3, wherein said first links are formed of a material selected from the group consisting of aluminum and magnesium and said second links are formed of a material selected from a group consisting of Kovar and Invar.

5. A thermal compensator mechanism as in claim 2, wherein said linkage assembly includes n link pairs, n being defined as a positive integer, and further wherein a second end of a first link of the first of n pairs is connected to said lens mounting structure and the second end of the nth pair second link is connected to the support structure.

6. A thermal compensator mechanism as in claim 5, wherein said first links are selected from the group consisting of aluminum and magnesium, and said second links are selected from a group consisting of Kovar and Invar.

7. A folded element linkage assembly for producing linear motion in response to temperature change comprising:
   a plurality of elongated link elements of a first type having a first linear coefficient of expansion, being adjacently arranged so as to be substantially parallel;
   at least one elongated link element of a second type having a linear coefficient of expansion which is less than that of said first link type;
   one of said at least one second type link elements being connected between opposite ends of adjacent first type link elements to define a linkage assembly having two free ends;
   means for providing a relatively fixed reference being connected to one of said free ends; and
   means connected to the other of said free ends for responsively moving with respect to said reference means as said linkage assembly responds to changing temperatures.

8. A linkage assembly as in claim 7, wherein n first type and n−1 second type link elements, n being defined as a positive integer greater than 1, are connected together in a folded manner so that an i th second type link element, i being defined as any positive integer less than n, is connected between opposite ends of a corresponding i th and an i+1 first type elements; and said assembly further comprising means for guiding said first and second type link elements during said responsive linear motion.

9. A link assembly as in claim 7, employed as a thermal compensator in an optical telescope system
   wherein said responsively moving means includes means holding at least one optical lens; and
   said relatively fixed reference means includes means supporting said lens holding means;
   and said assembly is connected between said holding means and said support means to cause relative movement therebetween in response to temperature changes.

* * * * *